United States Patent [19]

Ames et al.

[11] 4,212,502
[45] Jul. 15, 1980

[54] BEARING TAKE-UP FRAME

[75] Inventors: Ernest R. Ames, Wallingford; Hilarius S. Struttmann, Maysville, both of Ky.; Erwin R. Carrigan, Manchester, Ohio

[73] Assignee: Emerson Electric Co., St. Louis, Mo.

[21] Appl. No.: 948,279

[22] Filed: Oct. 3, 1978

[51] Int. Cl.² .............................................. F16C 29/00
[52] U.S. Cl. .................................... 308/3 R; 308/31; 308/59
[58] Field of Search .................. 308/3 R, 3 A, 32, 59, 308/65, 31, 58

[56] References Cited

U.S. PATENT DOCUMENTS

| 2,321,329 | 6/1943 | Stafford et al. | 308/32 |
| 2,639,199 | 5/1953 | Patrosio | 308/59 |
| 3,054,645 | 9/1962 | Evans | 308/3 A |
| 3,885,837 | 5/1975 | Mellor | 308/3 R |

OTHER PUBLICATIONS

Browning Catalogue DRS-2, Jul. 1, 1977, p. 8.

Primary Examiner—Lenard A. Footland

[57] ABSTRACT

An elongated, rectangular, bearing take-up frame has guide rails on the longitudinal frame members for guiding a slidably adjustable bearing block therebetween and an aperture in one end member midway between the guide rails for journalling and retaining a motion transmission screw nut. The frame is divided into two detachably connected portions so as to permit the lateral entry or removal of the bearing block and transmission screw and nut in a direction perpendicular to the axis of the bearing block.

5 Claims, 9 Drawing Figures

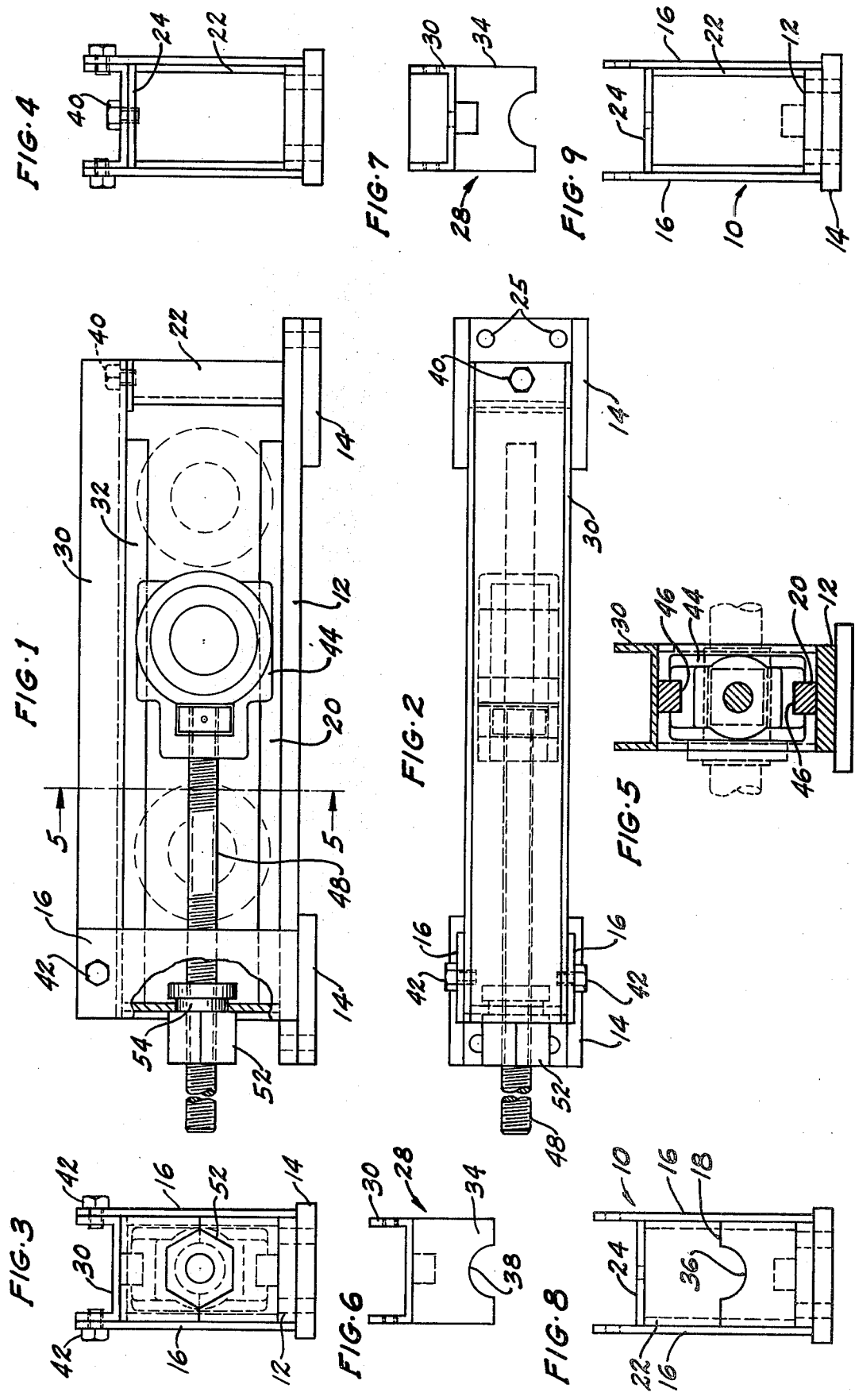

BEARING TAKE-UP FRAME

This invention relates to means for slidably adjusting a bearing to compensate for the stretching of a conveyor or drive belt or the wearing of a chain driven by a shaft journalled in the bearing. It particularly relates to a bearing take-up frame having separable detachably connected portions to permit the lateral entry of a bearing and bearing block therein or its removal therefrom.

BACKGROUND OF THE INVENTION

There are presently commercially available bearing take-up frames in which the frame members are permanently connected by welding as exemplified in the drawing at the top of the accompanying copy of a catalog sheet 263, marked Exhibit "A". In this arrangement, the upper guide member X is shortened sufficiently to permit entry therein of the slidable bearing block Y. This shortening of the upper guide member limits the adjustment range of bearing block Y, and the frame needs to be made sufficiently longer than the adjustment range to permit the entry of bearing block Y. Also, in this arrangement, the bearing block Y is moved in a direction parallel to the axis of a shaft to be journalled therein, so that it is necessary to move the entire take-up frame in order to place the bearing on a shaft when the bearing block and bearing are assembled in the frame or to enter the bearing block and bearing into the frame if they are assembled on a shaft.

There are also presently commercially available bearing take-up frames having separable and detachably connected upper and base portions so as to permit lateral entry or removal of the bearing and bearing block Y in a direction perpendicular to the axis of a shaft journalled therein while the base portion is anchored in place and so that the additional frame length may be dispensed with. The drawing at the top of the accompanying copy of a catalog sheet 125, marked Exhibit "B," exemplifies such an arrangement. In this arrangement, however, the transmission screw Z is positioned along the top side of the bearing block Y and threadedly engages the top side of the block to slidably move it as the screw is turned. The block Y is guided only on its lower side by the guide channel X.

OBJECTS OF THE INVENTION

An object of the invention is to provide a generally new and improved bearing take-up frame having separable, detachably connected, upper and base portions to permit lateral entry or removal of a bearing block and bearing in a direction perpendicular to the axis of a shaft to be journalled therein.

A further object is to provide a bearing take-up frame having separable, detachably connected, spaced, parallel guide rails for guiding a slidably adjustable bearing block therebetween and a member extending perpendicularly between the guide rails having a perforation therein for supporting a transmission screw connected to a central portion of the bearing block and for journalling a nut on the screw.

Other objects and advantages will be apparent when reading the following description in connection with the accompanying drawing.

IN THE DRAWING

FIG. 1 is a side elevational view of a bearing take-up frame constructed in accordance with the invention, and is shown with a bearing block, transmission screw, and nut mounted therein;

FIG. 2 is a top plan view of the frame shown in FIG. 1;

FIG. 3 is a left end elevational view of the frame;

FIG. 4 is a right end elevational view of the frame;

FIG. 5 is a transverse cross-sectional view taken along lines 5—5 of FIG. 1;

FIG. 6 is a left end elevational view of the upper frame portion;

FIG. 7 is a right end elevational view of the upper frame portion;

FIG. 8 is a left end elevational view of the lower frame portion; and

FIG. 9 is a right end elevational view of the lower frame portion.

DESCRIPTION OF A PREFERRED FORM OF THE INVENTION

Referring to the drawing, the elongated take-up frame consists of upper and lower separable portions detachably connected. The lower frame portion, generally indicated at 10, comprises an horizontal base plate 12 having foot plates 14 welded to the underside thereof at each end. A pair of upright side plates 16 are welded at their lower ends to the left-hand foot plate 14 and to opposite sides of the base plate 12 near its left end. Between upright plates 16 is a transverse upright plate 18 welded along its vertical sides to plates 16 and at its lower end to the base 12. A lower, longitudinal guide rail 20 is welded to the upper side of base plate 12 and positioned on the longitudinal center line of base plate 12.

The lower frame portion 10 further includes an upright channel member 22 welded at its lower end to the upper surface of base plate 12 near its right end. At the upper end of channel member 22 there is a horizontal plate member 24 welded to the channel 22. The base plate 12 and foot plates 14 are provided with clearance holes 25 extending therethrough for receiving bolts or screws to attach the frame to support structure.

The upper portion of the frame, generally indicated at 28, comprises a horizontal channel member 30 positioned with its flanges extending upward from its web. Attached by welding to the underside of the web of channel 30 is an upper longitudinal guide rail 32 in alignment with lower guide rail 20. A second vertical transverse plate 34 is welded at its upper end to the web of channel 30 near its left end. The plate 34 is parallel with and in vertical alignment with plate 18 in the lower frame portion.

The plate 18 of the lower frame portion 10 and the plate 34 of the upper frame portion 28 each extend vertically halfway between upper and lower horizontal members 30 and 20 and each have a semicircular notch 36 and 38, respectively, in the meeting ends thereof therein which, when the upper and lower frame portions 10 and 28 are assembled, form a circular aperture positioned midway between the upper and lower guide rails 32 and 20.

The upper and lower frame portions 10 and 28 are detachably connected at the right end by a screw 40 passing through a clearance hole in the web of channel 30 and threadedly engaged in a screw-threaded bore in the horizontal plate member 24. At the left end the upper end lower frame portions are detachably connected by screws 42 passing through clearance holes in side plates 16 and threadedly engaged in screw-threaded bores in the flanges of channel member 30.

Mounted in the frame for sliding motion between upper and lower guide rails 20 and 32 is a bearing block 44 having a transverse central bore therethrough midway between the upper and lower guide rails adapted to receive a frictionless bearing. The block 44 has upper and lower grooves 46 therein nicely interfitting with the guide rails. A motion transmission screw 48 positioned midway between the guide rails and parallel therewith is connected to the block 44 at one end and extends therefrom through and in threaded engagement with a nut 52. The nut 52 has a short, reduced diameter portion 54 extending through the aperture formed in plates 18 and 34, whereby it is journalled in the aperture and retained against axial movement. Rotation of nut 52 therefore imparts linear motion to the bearing block 44.

It will be seen from the foregoing that when considerable force is applied to the bearing block 44 to take up slack or tighten a belt driven by a shaft journalled in the bearing block, such force will be applied along a line passing through the center of such drive shaft thereby precluding any tendency to cause binding of the bearing block on the guide rails.

What is claimed is:

1. A bearing take-up frame having upper and lower elongated horizontal members and vertical end members extending between said horizontal members at the ends thereof and a guide rail fixed to and extending along each of said horizontal members for guiding a slidably adjustable bearing block therebetween, one of said vertical end members at one end of the frame being fixed to one of said horizontal members and detachably connected to the other horizontal member, the other of said vertical end members at the other end of the frame comprising an upper portion and a lower portion, each of said portions extending vertically substantially halfway between said upper and lower horizontal members and each of said portions being fixed at one end to one of said horizontal members and meeting at its free end with the free end of the other portion along a line midway between said guide rails, each of said end member portions having a semicircular notch in its free end, which notches together form a circular perforation for journalling and retaining a transmission screw nut therein, and vertical side plates for connecting said horizontal members at said other end of the frame, and said vertical side plates being fixed at one end to one of said horizontal members and detachably connected to the other of said horizontal members.

2. The take-up frame claimed in claim 1 in which said lower horizontal member is a relatively thick, rigid, elongated metal plate extending at each end beyond said vertical end members and having holes therein to receive frame mounting screws.

3. The take-up frame claimed in claim 1 in which said guide rails are rectangular in cross section and are welded to the facing surfaces of said upper and lower horizontal members.

4. The take-up frame claimed in claim 1 in which said one vertical end member is welded at its lower end to said lower horizontal member and detachably connected to said upper horizontal member by a screw-threaded member, and in which the lower end portions of said vertical side plates are welded to the sides of said lower horizontal member and the upper ends thereof connected to said upper horizontal member by screw-threaded members.

5. The take-up frame claimed in claim 1 in which said upper and lower portions of said other vertical end member are plates each having one end thereof welded to a horizontal member, and in which the vertical sides of one of said portions is welded to the inner surfaces of said side plates.

* * * * *